2,897,242
α,α'-BIS(5-CUMYL-2-HYDROXYPHENYL) MESITOL

David J. Beaver, Richmond Heights, and Paul J. Stoffel, Florissant, Mo., assignors to Monsanto Chemical Company, St. Louis, Mo., a corporation of Delaware No Drawing. Application September 18, 1953
Serial No. 381,116

1 Claim. (Cl. 260—619)

This invention relates to a new and useful composition of matter. More particularly this invention relates to α,α'-bis(5-cumyl-2-hydroxyphenyl)mesitol.

The new compound is prepared by heating substantially 0.2 molecular proportion of 2-hydroxy-$\alpha^1,\alpha^3$-mesitylenediol with substantially 0.6 molecular proportion of p-α,α-dimethylbenzylphenol in the presence of substantially 0.05 molecular proportion of concentrated hydrochloric acid. After heating for a period of about 12 minutes, the mix is cooled and the cooled reaction mass slurried with toluene and allowed to stand overnight. Upon filtration, the filter cake is washed with toluene and dried. α,α'-Bis(5-cumyl-2-hydroxyphenyl)mesitol, empirical formula $C_{39}H_{40}O_3$, is a white solid possessing a melting point of about 218–219° C.

The new compound of this invention exhibits antioxidant properties in sulfur-vulcanizable rubber compositions. Its non-discoloring properties are particularly noteworthy and as a result thereof the new compound is highly useful in light colored rubber goods. α,α'-Bis(5-cumyl-2-hydroxyphenyl)mesitol is readily incorporated in sulfur-vulcanizable rubber compositions by milling or similar procedure or by adding to sulfur-vulcanizable rubber in the form of a latex prior to coagulation or by applying to the surface of a mass of a crude or a vulcanized sulfur-vulcanizable rubber. Generally amounts in the range of about 0.5 to about 3% by weight based upon the sulfur-vulcanizable rubber render age-resistant properties under conditions ordinarily encountered in practice.

As illustrative of the usefulness of the new compound of this invention is the following:

Rubber stocks suitable for the manufacture of white rubber goods were compounded comprising

| Stock | A | B |
|---|---|---|
| | Parts by weight | |
| Pale crepe rubber | 100 | 100 |
| Zinc oxide | 60 | 60 |
| Lithopone | 20 | 20 |
| Sulfur | 2 | 2 |
| Diphenyl guanidine phthalate | 0.875 | 0.875 |
| 2-Benzothiazolyl thiolbenzoate | 0.625 | 0.625 |
| Paraffin | 0.250 | 0.250 |
| α,α'-Bis(5-cumyl-2-hydroxyphenyl)mesitol | | 1.0 |

The stocks so compounded were cured in a press at 126° C. for 45 and 60 minutes and then artificially aged by heating in an air bomb at 121° C. under 80 lbs./in.$^2$ air pressure. The modulus and tensile properties before and after aging were as follows:

Table I

| Stock | Hrs. Aged | Cure Time in Mins. | Modulus of Elasticity in lbs./in.$^2$ at Elongation of 500% | Tensile at Break in lbs./in.$^2$ | Ult. Elong., Percent |
|---|---|---|---|---|---|
| A | 0 | 45 | 1,836 | 4,343 | 695 |
| B | 0 | 45 | 2,090 | 4,335 | 675 |
| A | 0 | 60 | 1,685 | 4,175 | 710 |
| B | 0 | 60 | 2,020 | 3,845 | 630 |
| A | 9 | 45 | 676 | 743 | 580 |
| B | 9 | 45 | 1,180 | 1,635 | 590 |
| A | 9 | 60 | 625 | 750 | 570 |
| B | 9 | 60 | 1,080 | 1,256 | 546 |

As illustrative of the outstanding non-discoloring properties of α,α'-bis(5-cumyl-2-hydroxyphenyl)mesitol in light colored rubber goods, the following stocks were compounded comprising

| Stock | C | D | E |
|---|---|---|---|
| | Parts by weight | | |
| Pale crepe rubber | 100 | 100 | 100 |
| Zinc oxide | 60 | 60 | 60 |
| Lithopone | 20 | 20 | 20 |
| Sulfur | 2 | 2 | 2 |
| Diphenyl guanidine phthalate | 0.825 | 0.825 | 0.825 |
| 2-Benzothiazolyl thiolbenzoate | 0.675 | 0.675 | 0.675 |
| Paraffin | 0.250 | 0.250 | 0.250 |
| α,α'-Bis(5-cumyl-2-hydroxyphenyl) mesitol | 1.0 | | |
| Santowhite Crystals [1] | | 1.0 | |

[1] A commercial dialkyl phenol monosulfide non-discoloring rubber antioxidant manufactured by Monsanto Chemical Company.

The stocks so compounded were cured in a press at 126° C. for 45 minutes and 60 minutes and the resistance to discoloration measured by exposure of the cured stocks to an S–1 sunlamp for 10 days. After exposure the light reflected from the surface was measured by means of a Photovolt Reflectance Meter calibrated against reflectance of standard magnesium oxide as 100%. The data set forth below are the average percent reflectance of the respective cures at zero time and after 10 days exposure.

Table II

| Stock | Cure Time in Mins. | Light Reflectance, Percent | |
|---|---|---|---|
| | | At Zero Time | After 10 Days |
| C | 45 | 71 | 69 |
| D | 45 | 67 | 53 |
| E | 45 | 71 | 72 |
| C | 60 | 70 | 71 |
| D | 60 | 70 | 57 |
| E | 60 | 70 | 73 |

Although natural rubber has been employed to illustrate the utility of the new compound of the present invention, it is to be understood that the expression sulfur-vulcanizable rubber is employed in the specification and claims in a generic sense to define a sulfur-vulcanizable polymer and includes reclaimed rubber, balata, gutta percha and synthetically prepared rubbery diene polymers, as for example a butadiene-1,3 polymer, copolymers of butadiene-1,3 with styrene or acrylonitrile and the like.

This application is a continuation-in-part of our application Serial No. 314,204, filed October 10, 1952, now U.S. Patent No. 2,841,627, issued July 1, 1958.

What is claimed is:

α,α'-Bis(5-cumyl-2-hydroxyphenyl)mesitol.

References Cited in the file of this patent

UNITED STATES PATENTS

| | | |
|---|---|---|
| 2,440,909 | Niederl | May 4, 1948 |
| 2,543,489 | DeGroote et al. | Feb. 27, 1951 |
| 2,625,568 | Young et al. | Jan. 13, 1953 |
| 2,628,212 | Young | Feb. 10, 1953 |
| 2,716,096 | Young et al. | Aug. 23, 1955 |
| 2,731,442 | Forman | Jan. 17, 1956 |
| 2,773,907 | Sullivan et al. | Dec. 11, 1956 |
| 2,783,279 | Chiddix | Feb. 26, 1957 |